United States Patent
Das et al.

(10) Patent No.: US 7,216,343 B2
(45) Date of Patent: May 8, 2007

(54) METHOD AND APPARATUS FOR AUTOMATIC UPDATING AND TESTING OF SOFTWARE

(75) Inventors: Rajarshi Das, New Rochelle, NY (US); Edwin Richie Lassettre, Los Gatos, CA (US); Alla Segal, Mount Kisco, NY (US); Ian Nicholas Whalley, Pawling, NY (US); Steve Richard White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 10/252,868

(22) Filed: Sep. 20, 2002

(65) Prior Publication Data

US 2004/0060044 A1 Mar. 25, 2004

(51) Int. Cl.
*G06F 9/44* (2006.01)
(52) U.S. Cl. .................. 717/168; 717/124
(58) Field of Classification Search .......... 717/171, 717/176
See application file for complete search history.

(56) References Cited

U.S. PATENT DOCUMENTS

| | | | |
|---|---|---|---|
| 5,638,494 A | 6/1997 | Pinard et al. | |
| 5,701,400 A | 12/1997 | Amado | 395/76 |
| 5,790,789 A | 8/1998 | Suarez | |
| 5,805,776 A * | 9/1998 | Juengst et al. | 706/59 |
| 5,832,467 A | 11/1998 | Wavish | 706/13 |
| 5,909,544 A * | 6/1999 | Anderson et al. | 709/208 |
| 5,935,264 A * | 8/1999 | Nevill et al. | 714/724 |
| 5,978,911 A * | 11/1999 | Knox et al. | 713/1 |
| 6,023,586 A * | 2/2000 | Gaisford et al. | 717/178 |
| 6,026,374 A | 2/2000 | Chess | 705/26 |
| 6,055,562 A | 4/2000 | Devarakonda et al. | |
| 6,125,359 A * | 9/2000 | Lautzenheiser et al. | 706/60 |
| 6,182,245 B1 * | 1/2001 | Akin et al. | 714/38 |
| 6,199,204 B1 * | 3/2001 | Donohue | 717/178 |
| 6,219,829 B1 * | 4/2001 | Sivakumar et al. | 717/131 |
| 6,256,771 B1 | 7/2001 | O'Neil et al. | 717/1 |
| 6,286,131 B1 * | 9/2001 | Beers et al. | 171/125 |
| 6,330,586 B1 | 12/2001 | Yates et al. | 709/201 |

(Continued)

FOREIGN PATENT DOCUMENTS

WO     WO 02/093290     11/2002

OTHER PUBLICATIONS

Feng, An, Kikuno, Tohru, Torii, Koji, "Updating Semantic Information to Support Coordination in Distributed Software Development Environments", p. 13-22, 1993 IEEE, retrieved from IEEE database Mar. 4, 2004.*

(Continued)

*Primary Examiner*—Mary J. Steelman
(74) *Attorney, Agent, or Firm*—Duke W. Yee; Eustus D. Nelson; Lisa L. B. Yociss (57) ABSTRACT

A method, apparatus, and computer instructions for updating a software component. A determination is made as to whether to update the software component. The software component is updated to form an updated software component in response to a determination to update the software component. The updated software component is automatically tested. A corrective action is performed in response to a failure in testing of the updated component.

28 Claims, 5 Drawing Sheets

U.S. PATENT DOCUMENTS

| | | | |
|---|---|---|---|
| 6,353,897 B1* | 3/2002 | Nock et al. | 714/38 |
| 6,360,331 B2 | 3/2002 | Vert et al. | 714/4 |
| 6,463,584 B1* | 10/2002 | Gard et al. | 717/171 |
| 6,467,088 B1 | 10/2002 | AlSafadi et al. | 717/713 |
| 6,473,794 B1* | 10/2002 | Guheen et al. | 709/223 |
| 6,529,950 B1 | 3/2003 | Lumelsky et al. | 709/218 |
| 6,567,957 B1 | 5/2003 | Chang et al. | 716/4 |
| 6,584,455 B1 | 6/2003 | Hekmatpour | 706/45 |
| 6,751,608 B1 | 6/2004 | Cohen et al. | 707/3 |
| 6,779,016 B1 | 8/2004 | Aziz et al. | 709/201 |
| 6,804,709 B2* | 10/2004 | Manjure et al. | 709/220 |
| 6,834,341 B1 | 12/2004 | Bahl et al. | 713/156 |
| 6,851,115 B1 | 2/2005 | Cheyer et al. | |
| 6,892,218 B2 | 5/2005 | Heddaya et al. | |
| 6,970,869 B1 | 11/2005 | Slaughter et al. | |
| 2002/0100036 A1* | 7/2002 | Moshir et al. | 717/173 |
| 2002/0120685 A1 | 8/2002 | Srivastava et al. | 709/203 |
| 2002/0143819 A1 | 10/2002 | Han et al. | 707/513 |
| 2002/0174414 A1* | 11/2002 | Matsuo et al. | 717/126 |
| 2002/0183866 A1 | 12/2002 | Dean et al. | 700/26 |
| 2003/0154279 A1 | 8/2003 | Aziz | 709/225 |
| 2003/0200293 A1 | 10/2003 | Fearn et al. | 709/223 |
| 2003/0212924 A1* | 11/2003 | Avvari et al. | 714/38 |
| 2003/0235158 A1* | 12/2003 | Lee et al. | 370/256 |
| 2004/0236843 A1 | 11/2004 | Wing et al. | 709/219 |

OTHER PUBLICATIONS

Gavrilovska, Ada, Schwan, Karsten, Oleson, Van, "A Parctical Approach for 'Zero' Downtime in an Operational Information System", Jul. 2002, retrieved from IEEE database Mar. 4, 2004.*

Panagos, E., Biliris, A., "Synchronization and Recovery in a Client-Server Storage System", p. 209-223, 1997 The VLDB Journal, retrieved from ACM Portal database Mar. 4, 2004.*

Yajnik, Shalini, "STL: A Tool for On-line Software Update and Rejuvenation", p. 258, 1997 IEEE, retrieved from IEEE database Mar. 4, 2004.* http://www.ibm.com/research/autonomic, "Autonomic Computing: IBM's Perspective on the State of Information Technology", Oct. 2001, pp. 1-40.

IBM Technical Disclosure Bulletin, Mar. 2002, No. 455, p. 499, "Distributed UDDI (Universal Description Discovery and Integration) Registry Lookup and Storage".

Bagchi et al., "Dependency Analysis in Distributed Systems using Fault Injection: Application to Problem Determination in an e-commerce Environment", Distributed Operations and Management, 2001, 11 pages.

Brown et al., "An Active Approach to Characterizing Dynamic Dependencies for Problem Determination in a Distributed Environment", Seventh IFIP/IEEE International Symposium on Integrated Network Management, 2001, 14 pages.

Butler et al., "Error Burst Metrics for Failure Trajectory Analysis", International Transmission System, IEE Colloquium, The Institution of Electrical Engineers, 1994, IEE, Savoy Place, London WC2R 0BL, UK, 4 pages.

Goswami et al., "Prediction-Based Dynamic Load-Sharing Heuristics", IEEE Transactions on Parallel and Distributed Systems, vol. 4, No. 6, Jun. 1993, pp. 638-648.

Hellerstein, "An Approach to Selecting Metrics for Detecting Performance Problems in Information Systems", Proceedings of the Second International Conference on Systems Management, Jun. 19-21, 1996, Toronto, Canada, pp. 1-11.

Hellerstein et al., "Mining Event Data for Actionable Patterns", IBM Thomas J. Watson Research Center, Hawthorne, New York, The Computer Management Group, 2000, 12 pages.

Keller et al., "Classification and Computation of Dependencies for Distributed Management", Proceedings of the Fifth IEEE Symposium on Computers and Communication, 2000, pp. 78-83.

Muggleton et al., "Efficient Induction of Logic Programs", The Turing Institute, Glasgo, UK, pp. 1-14.

Quinlan et al., "Induction of Logic Programs: FOIL and Related Systems", New Generation Computing 13, 1995, pp. 287-312, 28 pages.

Lee et al., "Error/Failure Analysis Using Event Logs from Fault Tolerant Systems", Fault-Tolerant Computing, 1991, FTCS-21, Digest of Papers, Twenty-First International Symposium, 1991, pp. 10-17.

Ma et al., "Event Browser: A Flexible Tool for Scalable Analysis of Event Data", Distributed Operations and Management, 1999, pp. 1-12.

Ma et al., "Mining Mutually Dependent Patterns", IEEE Conference on Data Mining, 2001, pp. 1-20.

Tang et al., "Analysis and Modeling of Correlated Failures In Multicomputer Systems", IEEE Transactions on Computers, vol. 41, No. 5, May 1992, pp. 567-577.

Thottan et al., "Proactive Anomaly Detection Using Distributed Intelligent Agents", IEEE Network, Sep./Oct. 1998, pp. 21-27.

Vilalta et al., "Predictive Algorithms in the Management of Computer Systems", IBM Systems Journal, vol. 41, No. 3, 2002, pp. 461-474.

Rouvellou et al., "Combining Different Business Rules Technologies: A Rationalization", Proc. Of the OOPSLA 2000 Workshop on Best-Practices in Business Rule Design and Implementation, Minneapolis, MN, Oct. 2000, pp. 1-6.

Grosof, IBM Research Report RC20836, "Courteous Logic Programs: Prioritized Conflict Handling for Rules", May 97, 63pp.

Van Den Heuvel W -J et al: "Service Representation, Discovery, and Composition for E-marketplaces", Cooperative Information Systems. 9th International Conference Coopis 2001. Proceedings (Lecture Notes in Computer Science vol. 2172), Proceedings, Trento, Italy, Sep. 5-7, 2000, pp. 270-284.

Piccinelli et al., "Dynamic Service Aggregation in Electronic Marketplaces", Computer Networks 37 (2001), Elsevier Science Publishers B.V., Amsterdam, NL, vol. 37, No. 2, Oct. 2001, pp. 95-109.

Guttman, "Service Location Protocol: Automatic Discovery of IP Network Services", IEEE Internet Computing, IEEE Service Center, Piscataway, NJ, US, vol. 3, No. 4, Jul. 1, 1999, pp. 71-80.

Stevens, "18.2 Connection Establishment and Termination", TCP/IP Illustrated, vol. 1: The Protocols, Addison-Wesley, 1994, pp. 15-16, 229-234.

Newton's Telecom Dictionary, "Denial of Service Attack", Feb. 2002, CMP Books, 18th Edition, p. 214.

Addis et al., "Negotiating for Software Services", 2000, IEEE, pp. 1039-1043.

Faratin et al., "Using Similarity Criteria to Make Negotiation Trade-Offs", 2000, IEEE, pp. 1-8.

Faratin, "Automated Service Negotiation Between Autonomous Computational Agents", Dec. 2000, University of London, Department of Electronic Engineering, Queen Mary & Westfield College, pp. 1-255 http://ccs.mit.edu/peyman/pubs/peyman-thesis.pdf.

IEEE 100 The Authoritative Dictionary of IEEE Standards Terms, "failover", Dec. 2000, Standards Information Network IEEE Press, Seventh Edition, p. 413.

* cited by examiner

METHOD AND APPARATUS FOR AUTOMATIC UPDATING AND TESTING OF SOFTWARE

CROSS REFERENCE TO RELATED APPLICATIONS

The present invention is related to the following applications entitled: "Method and Apparatus for Publishing and Monitoring Entities Providing Services in a Distributed Data Processing System", Ser. No. 10/252,816; "Composition Service for Autonomic Computing", Ser. No. 10/252,324; "Self-Managing Computing System", Ser. No. 10/252,247; and "Adaptive Problem Determination and Recovery in a Computer System", Ser. No. 10/252,979; all filed even date hereof, assigned to the same assignee, and incorporated herein by reference.

BACKGROUND OF THE INVENTION

1. Technical Field

The present invention relates generally to an improved data processing system, and in particular, to a method and apparatus for managing software components. Still more particularly, the present invention provides a method and apparatus for automatically updating software components.

2. Description of Related Art

Modern computing technology has resulted in immensely complicated and ever-changing environments. One such environment is the Internet, which is also referred to as an "internetwork". The Internet is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols. Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). The Internet also is widely used to transfer applications to users using browsers. Often times, users of software packages may search for and obtain updates to those software packages through the Internet.

Other types of complex network data processing systems include those created for facilitating work in large corporations. In many cases, these networks may span across regions in various worldwide locations. These complex networks also may use the Internet as part of a virtual product network for conducting business. These networks are further complicated by the need to manage and update software used within the network.

Such environments, made up of many loosely connected software components, are typically somewhat fragile. Within these environments, deploying a new version of one of the software components involved in the network data processing system is problematic, and may well have far-reaching and unforeseen effects on parts of the overall system that are only tangentially connected to the component being replaced. Even less obviously risky changes are often prone to cause unpredictable and undesirable side effects. Thus, system administrators are often extremely wary of performing updates, such as component upgrades or minor configuration changes, due to these far-reaching effects. When information systems are so critical to modern business, even seconds of downtime can be a serious problem, and tracing that downtime can take far more than seconds. For example, email servers provide a critical component for many businesses because these servers facilitate communications between users inside and outside of the business or organization. An update to an email server that results in errors in delivery of email messages can cause loss in productivity and loss of business for a company or organization.

As software changes to become increasingly "autonomic", the task of updating, configuring, and patching software will, more and more, be performed by the computers themselves, as opposed to being performed by administrators. The current updating mechanisms are moving towards an "autonomic" process. For example, many operating systems and software packages will automatically look for updates based on some event, such as a timer or a particular set of actions by a user. The update mechanisms often connect to the Internet at a preselected location to see whether an update is present. If an update is present, the message is presented to the user in which the message asks the user whether to download and install the update. A next step towards "autonomic" computing involves identifying and downloading the updates without requiring user intervention. Therefore, it would be advantageous to have an improved method, apparatus, and computer instructions to deal with the effects, be they undesired or merely unexpected, that such updating, reconfiguring, and patching of software could cause.

SUMMARY OF THE INVENTION

The present invention provides a method, apparatus, and computer instructions for updating a software component. A determination is made as to whether to update the software component. The software component is updated to form an updated software component in response to a determination to update the software component. The updated software component is automatically tested. A corrective action is performed in response to a failure in testing of the updated component.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
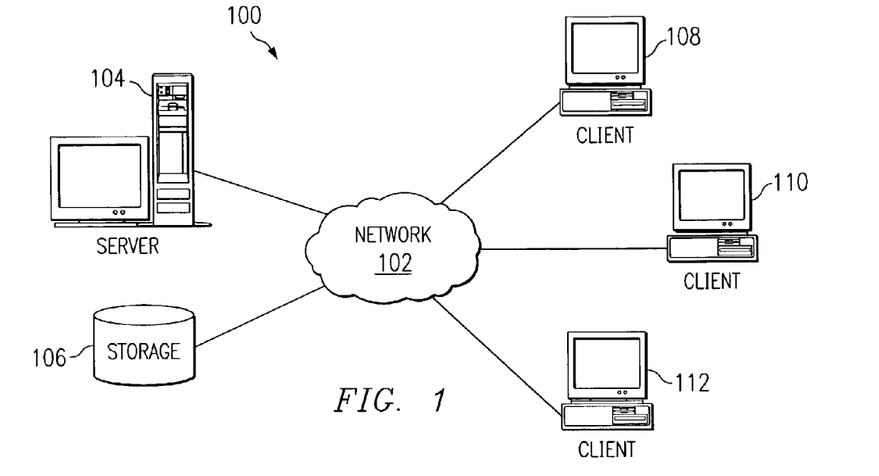
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 maybe, for example, personal computers or network computers. In the depicted example, server 104 provides data, such as boot files, operating system images, and applications to clients 108–112. Clients 108, 110, and 112 are clients to server 104. Server 104 may provide a source of updates for clients, such as clients 108, 110, and 112. In these examples, network data processing system 100 contains autonomic computing features, such as those for updating software components used within network data processing system 100. In particular, updates may be made to software components without requiring user intervention to obtain and install the updates. These updates may include, for example, updates to executable files for a software component, new executable or data files for a software component, or even a change in a configuration file for a software component. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
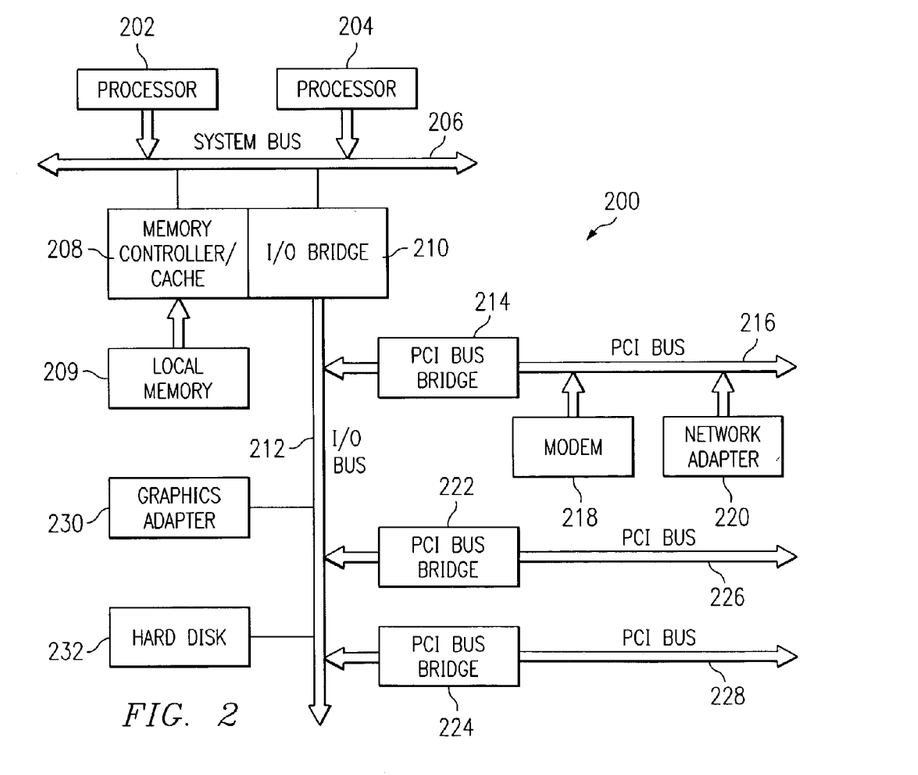
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
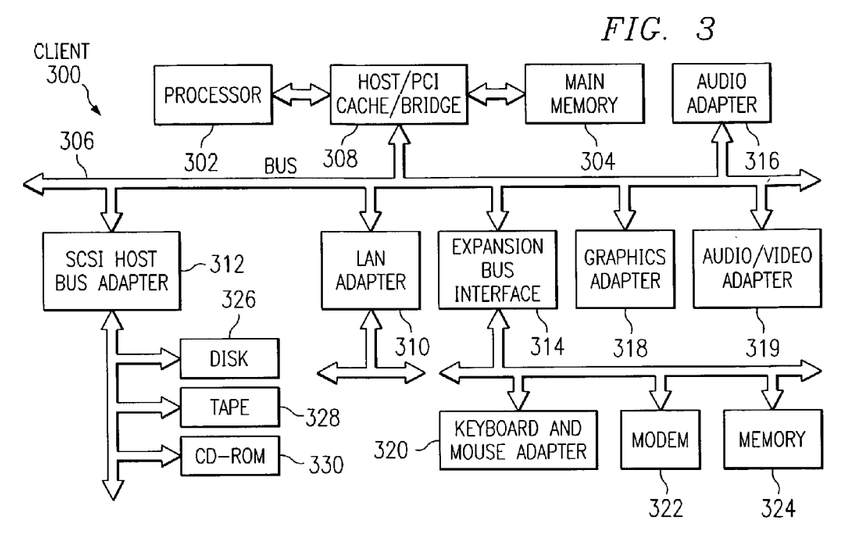
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI)

host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
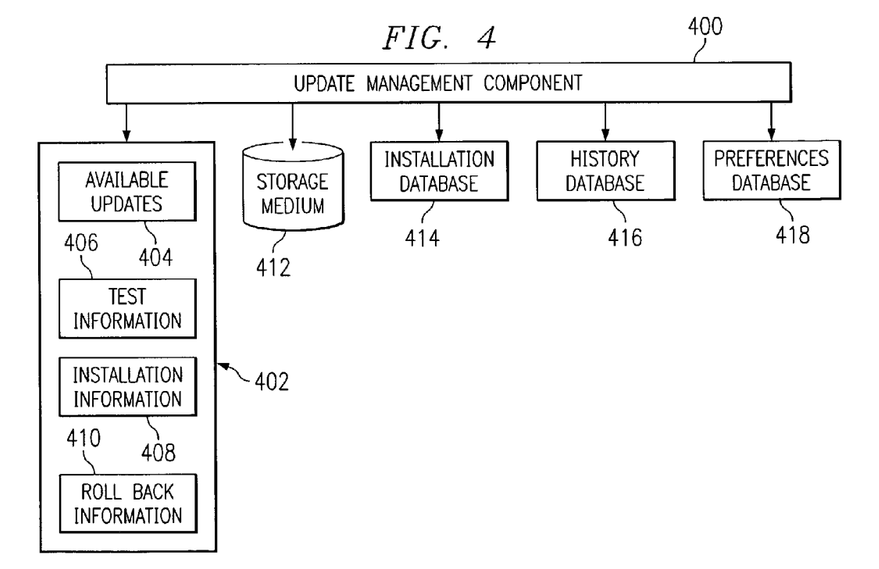
FIG. 4 is a diagram illustrating components used in updating a software component in accordance with a preferred embodiment of the present invention.

Turning now to FIG. 4, a diagram illustrating components used in updating a software component is depicted in accordance with a preferred embodiment of the present invention. These components may be located within a single data processing system, or one or more of these components may be located in one or more other data processing systems.

Update management component 400 employs database 402 in performing autonomic updates. The use of the term "autonomic update" means that an update to a software component is performed automatically using a software process without any user intervention. This update may include, for example, changes to an executable file, changes to a data file, an addition of a new executable file, an addition of a new data file, or changes to a configuration. Database 402 includes available updates 404, test information 406, installation information 408, and roll back information 410. Available updates 404 contains information on updates for different software components, which may be managed by update management component 400. This information may include, for example, presently available updates identified by version numbers, locations or paths on which updates may be identified, or the actual update files themselves. This information also may include an identification of different data processing systems participating in autonomic updates. If an update is located externally to available updates 404, these updates may be located through a path or location information. For example, update information within available updates 404 may point to storage medium 412, which is accessible by update management component 400. Storage medium 412 may be located on the same data processing system as update management component 400 or may be located on a remote data processing system. This storage medium may take many forms, such as, for example, a hard disk drive, a magnetic tape, or a CD-ROM.

Database 402 also includes test information for each update listed in available updates 404. Test information 406, in these examples, specifies zero or more tests that are to be performed following the autonomic deployment of an update. The use of the term "autonomic deployment" is interchangeable with the term "autonomic update". The tests performed after the autonomic update will vary depending on the particular implementation. Tests may include tests other than those used to determine whether the update has been properly installed. For example, in some cases the testing may involve performance testing, unit testing, compatibility testing, or on-the-fly regression testing. Unit testing involves testing a small section of a larger whole. For example, software unit tests are performed on individual objects for the particular software being developed to verify that these objects behave correctly in response to different inputs and outputs. In these examples, unit testing involves testing one or more components specifically related to the update that was applied. The update may be, for example, a new program file, a modified program file, or a configuration change. This type of testing is low cost in terms of time and impact and verifies on a course level that the updates are performing sufficiently to some standard or benchmark. Performance testing is employed to insure that the performance of the system after the update is acceptable. Various thresholds and benchmarks may be used as part of the performance testing. Compatibility testing may be employed to ensure that the updated component performs in a manner acceptable to other components with which the updated component communicates. Regression testing is another test that may be employed to determine whether the updated component performs equivalently to the old component. With performance testing, if the software component does not meet some metric or threshold, the test fails even though the update has been successfully deployed on the software component. The different types of testing performed are referred to as "autonomic" testing because the testing is performed automatically after an update has been performed. No user input is required to perform these tests. In these examples, autonomic tests are performed by update management component 400. An "autonomic" test is a test that is initiated and performed without requiring user input or intervention. In other words, an autonomic test is initiated in response to an update having just occurred without requiring a user to provide user input to a data processing system to select or initiate the test. Whether to perform a test and what test to perform are based on policies within test information 406. For example, the policy may specify that if the update is to an email server, performance testing is to be performed after the update has been deployed. Additionally, corrective actions to be taken may be included in test information 406. Corrective actions may include, for example, rolling back the update, installing an entirely different software component, or reinstalling the update with different parameters or options.

Further, database 402 also contains installation information 408. In these examples, this installation information specifies a procedure used by update management component 400 in installing or updating a software component with a particular update. Roll back information 410 specifies a procedure that is to occur if an update is to be rolled back. A roll back of an update involves removing the update and placing the software component back into its previous state prior to the update. Such a procedure is performed in accordance with a preferred embodiment of the present invention if testing of an updated software component yields a failure or some particular error. In some cases, an error may be minor, resulting in the update remaining without a roll back. In other cases, the error may be serious, resulting in update management component 400 performing a roll back of the update.

Installation database 414 is a database of software components and updates installed on a particular data processing system. Installation database 414 may contain information for one data processing system or for many data processing systems. Installation database 414 may be used by update management component 400 to cross-reference information in this database with available updates 404 to identify updates applicable to a particular data processing system. Next, history database 416 contains a history of updates made to a data processing system. For example, this history information includes an identification of updates from available updates 404 that have been deployed to a data processing system, when each update was deployed, as well as test results for testing performed on an update. This database also may track the status for more than one computer. Further, decisions made subsequent to testing of updates as well as any actions taken as a result of testing may be stored in history database 416. With history database 416, update management component 400 may make decisions on updates, such as, for example, which updates to install and when to install an update. Another database used by update management component 400 is preferences database 418. This database contains additional information used to control the operation of update management component 400. For example, preferences database 418 may specify that for a particular software component, the most recent update should never be installed. As a result, that particular software component will always run using an update prior to the currently available update.

In these examples, installation database 414, history database 416, and preferences database 418 may contain information relating to more than one client data processing system. For example, preferences database 418 may specify that for a particular software component and a particular data processing system, the most recent update should never been installed. As a result, that particular data processing system will always run using an update prior to the currently available update for that particular software component. Update management component 400 also may track other types of information other than that illustrated in database 402. For example, information relating to the past status of computers and updates may be stored in database 402.

Figure 5:
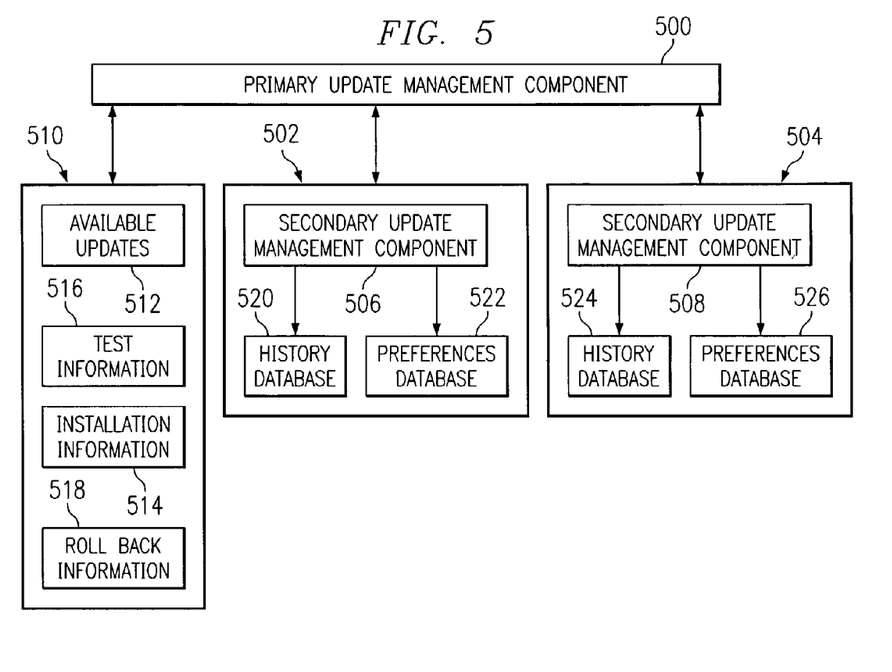
FIG. 5 is a diagram illustrating components used in autonomic updates in accordance with a preferred embodiment of the present invention.

With reference now to FIG. 5, a diagram illustrating components used in autonomic updates is depicted in accordance with a preferred embodiment of the present invention. In this example, updates are performed using a central or primary update component, such as primary update management component 500, to manage updates on a number of different clients, such as client 502 and 504. These clients contain secondary update management components, such as, for example, secondary update management components 506 and 508. Primary update management component 500 may be located on a server, such as server 104 in FIG. 1, while secondary update management components 506 and 508 may be located on clients, such as clients 108 and 110 in FIG. 1. Each of these secondary update management components manages software components on the client on which it is located.

In this example, database 510 is accessed by primary update management component 500 to control autonomic updates, testing, and roll backs of available updates. Available updates are located in available updates 512 in these examples. The information used to install updates on clients 502 and 504 is located in installation information 514, while tests to be performed after the install are located in test information 516. If testing fails, the procedure used to roll back an update is located in roll back information 518.

Secondary update management component 506 accesses history database 520 and preferences database 522, while secondary update management component 508 accesses history database 524 and preferences database 526. Each of these secondary update management components will contact primary update management component 500 to determine whether an update is available for each particular client. In checking for an available update, preference information and history information on installed updates may be sent to primary update management component 500 from secondary update management component 506 and secondary update management component 508. This check may be made based on some event, such as a periodic event, like the expiration of a timer or some other non-periodic event, such as the starting of the software component. The availability of updates is stored in available updates 512.

If an update is available, the procedure for installing the update is obtained from installation information 514 by primary update management component 500 and sent to secondary update management components 506 and 508. In response to receiving the installation information, secondary update management component 506 and secondary update management component 508 will perform the autonomic update using the procedures received from primary update management component 500. After installation of the update, secondary update management component 506 and secondary update management component 508 will perform testing of the update using test information from test information 516, received through primary update management component 500. If the tests are successful, the software components continue to operate. If the tests are unsuccessful, a roll back procedure is received from roll back information through primary update management component 500. Data and other statistical information regarding updates, testing, and roll backs are stored in history database 520 and history database 524.

In this particular example, primary update management component 500 may track additional information, such as that about computers participating in autonomic updates, an identification of a data processing system to perform testing, an identification of versions of each software component and configurations currently installed in the computers, as well as information about versions and configurations for software components available for installation. Additionally, primary update management component 500 also may track other information relating to updates and tests currently underway on clients. This information may include, for example, software components currently being updated and the state or stage of any testing being performed.

In the case of a critical software component, installation of that software component may be performed on a new client having a similar or identical configuration. For example, client 502 may be an email server forming a critical component of a network data processing system. When secondary update management component 506 identifies an available update to the email server component, another client is identified on which the update is to be performed. Specifically, an update may be made to client 504 by secondary update management component 508, while no updates are made by client 502. After the updates are made and testing is performed on the email server component on client 504, users may be transferred or migrated from client 502 to client 504. If no failures or errors occur, then client 502 may be phased out and client 504 may provide email services to the users. If an error occurs, then users may be moved back to client 502. This procedure provides for additional failsafe mechanisms in the case of some error or failure after an update has occurred. By performing the update on a second data processing system, while maintaining the first data processing system in a state without the update, the first data processing system may be brought back into service quickly in case of failure on the second data processing system. Of course, this procedure may be performed through a single management component directing updates and migration of use of a software component, as illustrated in FIG. 4, rather than employing the distributed structure illustrated in FIG. 5.

Figure 6:
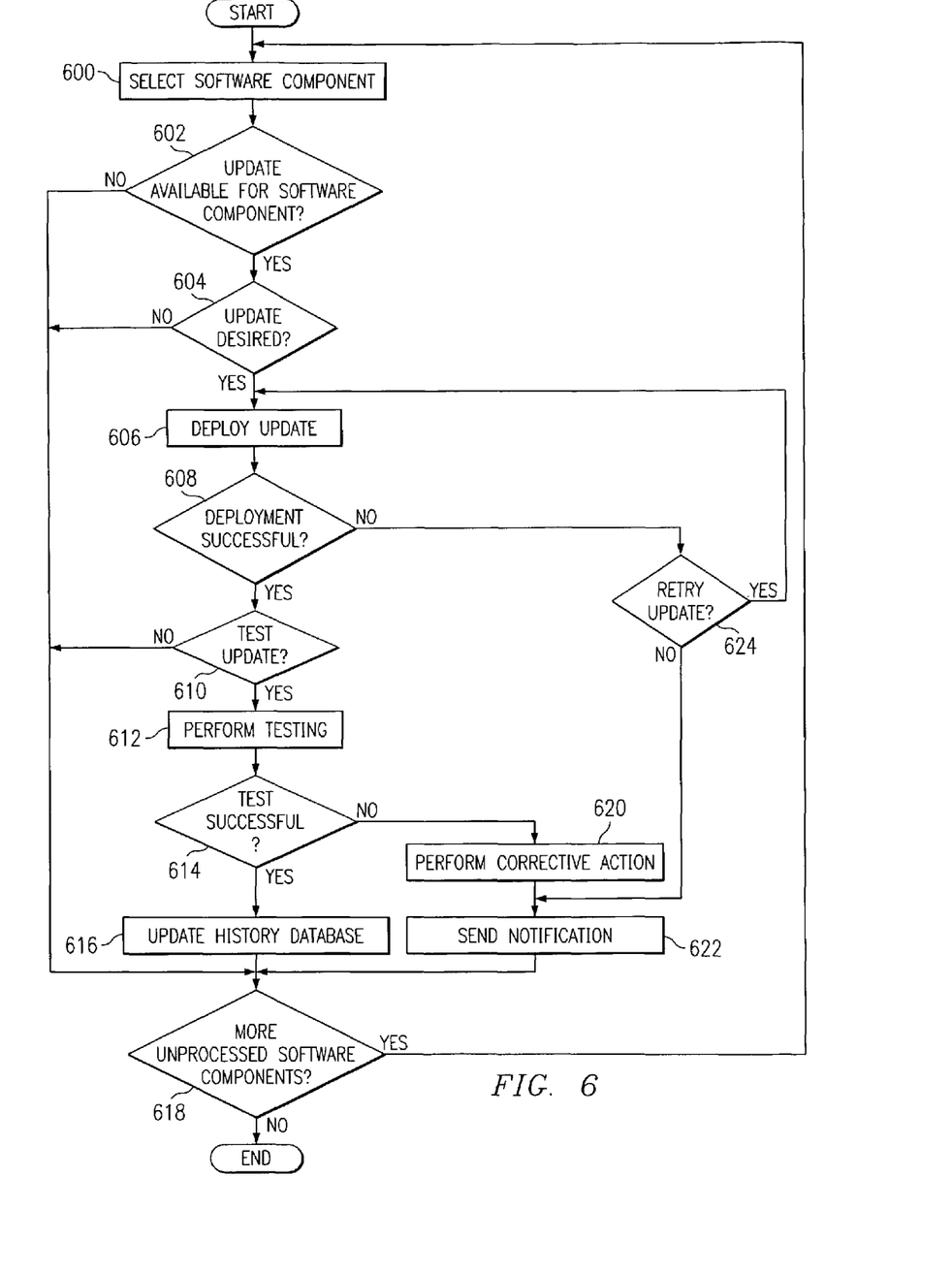
FIG. 6 is a flowchart of a process used for performing an autonomic update in accordance with a preferred embodiment of the present invention.

Turning now to FIG. 6, a flowchart of a process used for performing an autonomic update is depicted in accordance with a preferred embodiment of the present invention. The process illustrated in FIG. 6 may be implemented in an update management component, such as update management component 400 in FIG. 4.

The process begins by selecting a software component (step 600). Selection of a component may vary depending on the particular implementation. In these examples, the component selected may be identified by accessing an installation database, such as installation database 414 in FIG. 4. The installation database may identify software components installed on a particular data processing system. Alternatively, software components may be identified dynamically at a particular time, such as when an update is to be performed. A determination is made as to whether an update is available for the software component (step 602). This update may be made by checking a database, such as database 402 in FIG. 4 for information. If an update is available for the component, a determination is made as to whether the update is desired (step 604). This decision may be made with the aid of preference and history information, which may be found in databases, such as history database 416 and preferences database 418 in FIG. 4. If the update is desired, the update is deployed (step 606). After deployment of the update, a determination is made as to whether the deployment was successful (step 608). If the deployment is successful, a determination is made as to whether to test the update (step 610). In some cases, no tests may be performed on the update. If the update is to be tested, then one or more specified tests are performed (step 612). The particular test or tests to run are specified by test information, such as test information 406 found in database 402 in FIG. 4. After the testing has been performed, a determination is made as to whether the testing performed on the update was successful (step 614). If the testing was successful, a history database is updated (step 616). The history database is one, such as history database 416 in FIG. 4. The information written into the database includes information about the update form, results of the test, and any other data that could be used for determining the application of future updates to the software component. Next, a determination is made as to whether additional unprocessed software components are present (step 618). If additional unprocessed software components are not present, the process terminates.

Referring again to step 618, if additional unprocessed software components are present, the process returns to step 600 as described above. Returning to step 614, if the testing was not successful, a corrective action is performed (step 620). A roll back of the update to the software component may be performed as the corrective action. Other corrective actions that may be performed include, for example, identifying a different update to apply to the software component or accelerating a roll out of an entirely new software component to take the place of the present one. For example, if an update to a Web server process results in a test failure, a Web server process from a different source may be installed in place of the current one, rather than rolling back the Web server process to its un-updated state. The particular corrective action to take may be included in a database, such as database 402 in FIG. 4. If a roll back is performed, the process used to roll back the update can be identified from roll back information 410 in database 402 in FIG. 4. Thereafter, a notification is sent (step 622). The notifications are typically sent when no more attempts are made to reapply an update. This notification is typically sent to an administrative person. The notification may be sent through various communication mechanisms, such as, for example, email, pager, and simple network management protocol (SNMP) with the process proceeding to step 618 as described above.

Turning back to step 608, if the deployment was unsuccessful, a determination is made as to whether to retry the deployment of the update (step 624). If the update is to be repeated, the process returns to step 606. Otherwise, the process proceeds to step 622 as described above. In this case, the notification indicates a failure in the deployment. The notification may occur after various types of failures, such as, for example, when a single deployment fails, two or more attempted deployments of the same update to the same target fails, two or more attempted deployments of the same update to different targets fails, or one or more attempted deployments of two or more different updates to the same target fail. These notifications may be logged in a file or sent to administrative personnel depending on the particular implementation. With reference again to step 610, if testing is not to be performed, the process proceeds to step 618 as described above. In some cases, testing is not performed if metrics indicate that failures are unlikely to occur. The process also proceeds to step 618 from step 604 if the update is not desired. Referring again to step 602, if an update is not available for the component, the process also proceeds to step 618.

Figure 7:
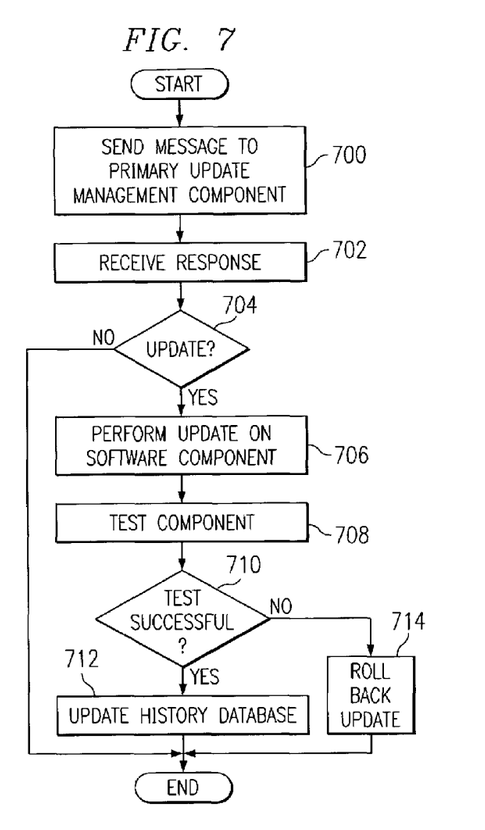
FIG. 7 is a flowchart of a process used for performing an autonomic update in accordance with a preferred embodiment of the present invention.

With reference now to FIG. 7, a flowchart of a process used for performing an autonomic update is depicted in accordance with a preferred embodiment of the present invention. The process illustrated in FIG. 7 may be implemented in a secondary update management component, such as secondary update management component 506 in FIG. 5.

The process begins by sending a message to the primary update management component (step 700). This message includes a query as to whether an update is available and should be performed. The message sent to the primary management component may include information, such as, for example, preference information on updates and history information on the last update performed on the software component. A response to the message is received (step 702). The message indicates whether an update is to be performed along with an identification of any update that is to be performed. This message also may include information, such as the procedure to install the update, an identification of one or more tests to perform after the update has been installed, and an identification of a roll back process if testing is unsuccessful. A determination is made as to whether an update is to be performed (step 704). If an update is to be performed, an update is performed on the software component using installation information received from the primary update management component (step 706). The component is tested (step 708) and a determination is made as to whether the test was successful (step 710). If the test was successful, a history database is updated (step 712) and the process terminates thereafter.

Returning again to step 710, if the test was not successful, a roll back of the update is performed to remove the update from the software component and place the software component back into its prior state (step 714) and the process terminates thereafter. Referring again to step 704, if an update is not to be performed, the process terminates.

The steps illustrated in FIG. 7 also may be modified to allow for a secondary update management component to be contact by a primary update management component. In this case, the primary update management component tells the secondary update management component what updates are available. Such a configuration is a push model in contrast to the pull model illustrated in these examples in which a secondary update management component queries the primary update management component to determine whether updates are available.

Figure 8:
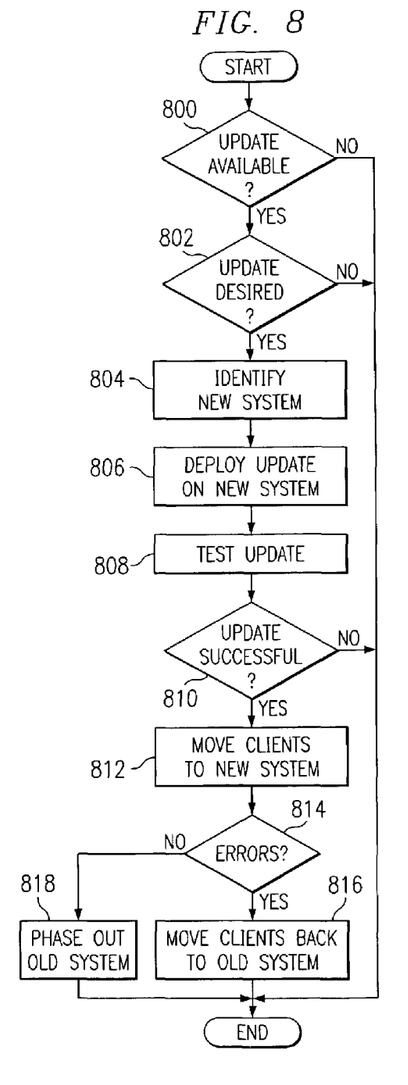
FIG. 8 is a flowchart of a process used for performing an autonomic update in accordance with a preferred embodiment of the present invention.

Turning now to FIG. 8, a flowchart of a process used for performing an autonomic update is depicted in accordance with a preferred embodiment of the present invention. The process illustrated in FIG. 8 may be implemented in an update management component, such as secondary update management component 506 in FIG. 5 and update management component 400 in FIG. 4. The process in this example is used to perform software updates on software components having critical functions.

The process begins by making a determination as to whether an update is available (step 800). If an update is available, a determination is made as to whether an update is desired (step 802). If an update is desired, a new system is identified (step 804). The new system is another data processing system, which is configured to provide the same function as the software component managed by the update management component. For example, if the software component is an email server, another data processing system containing the software component is selected to be updated. The update is deployed on the new system (step 806). The update on the new system is tested (step 808) and a determination is made as to whether the update is successful (step 810). If the update is successful, clients of the software component are moved to a new system (step 812). In step 812, some or all of the clients may be moved to the new system depending on the particular implementation. A determination is made as to whether errors are present after the clients have been moved or transitioned to the new system (step 814). If errors are present, clients are moved back to the old system (step 816) and the process terminates thereafter.

With reference again to step 814, if no errors are present, the old system is phased out (step 818) and the process terminates thereafter. Turning again to step 810, if the update is not successful, the process terminates. Of course, additional attempts to implement the update may be performed depending on the particular implementation. With reference again to step 802, if an update is not desired, the process terminates. Referring again to step 800, if an update is not available, the process terminates.

Figure 9:
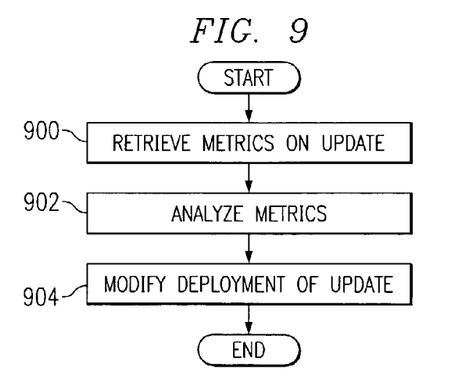
FIG. 9 is a flowchart of a process used for modifying autonomic updates in accordance with a preferred embodiment of the present invention.

Turning now to FIG. 9, a flowchart of a process used for modifying autonomic updates is depicted in accordance with a preferred embodiment of the present invention. The process illustrated in FIG. 9 may be implemented in an update management component, such as primary update management component 500 in FIG. 5.

The process begins by retrieving metrics on an update (step 900). These metrics may be retrieved from a history database, such as history database 520 or history database 524 in FIG. 5. These metrics may be pulled from a single client or node or from multiple clients or nodes in a network data processing system. These metrics include data, such as, for example, the date and clients on which roll outs were performed, the data and clients on which roll backs occurred, and any testing and test results related to the updates. The metrics are analyzed (step 902). This analysis may take various forms depending on the particular implementation. For example, the metrics may be analyzed to identify patterns and correlations between occurrences of faults between specific types or sets of software entities, users, types of hardware, and operating systems. The deployment of the update is modified using the analysis (step 904) and the process terminates thereafter. This modification may take various forms. For example, deployment of an update may be avoided on data processing systems on which an update is likely to fail. This modification also may include accelerated deployment of an update to data processing systems on which a successful deployment is likely. The modification also may include ceasing deployment of the update or modifying the update. The analysis may result in a modification in which additional updates are deployed or made to improve on the success of previous updates. Further, depending on the particular correlation or pattern identified in step 902, administrative personnel may be provided a notification of the correlation or pattern.

Thus, the present invention provides an improved method, apparatus, and computer instructions for an autonomic update of a software component. The mechanism of the present invention updates the software component, automatically tests the software component to determine whether faults or errors occur, and may roll back the update to a prior version or take some other corrective action in the event of a fault or error identified in testing. It will be evident that the update management component of the present invention is able to receive information about the progress and status of updates, and make decisions based on that information. These decisions can range from the simple (for example, a decision to roll back the upgrade and to not attempt a redeployment) to the complex (for example, a decision to partially roll back the upgrade—to roll it back from a subset of the upgraded computers—and to not attempt to deploy the upgrade to computers similar—by some relevant metric—to those on which the upgrade failed testing). It can therefore be seen that the presence of the update management component allows much more complex decisions to be made automatically, based on a much wider set of available data, than is possible without the update management component.

To elaborate, in another preferred embodiment, the dramatic success of the update (by one or more appropriate metrics) may accelerate the deployment of the update to other machines. In yet another embodiment, analysis of the metrics may indicate that the software update works well in some environments but not in others, and analysis may indicate similarities between the environments in which the update does not work—the update roll out may then continue to machines that do not share the similarity with the environments on which the update failed. In another embodiment, upon encountering problems with a component deployment, it may be decided to accelerate the deployment of another software component that is believed to resolve, or in some other way deal with, the problems detected. Another possible embodiment has the update management component performing the same update to many computers, and deciding, after the update and tests have succeeded on a number of those computers, to skip some or all of the tests on subsequent deployments of that update to the remaining computers.

Additionally, the mechanism of the present invention may maintain metrics of all the software updates, roll outs, roll backs, and testing to identify patterns of occurrences of faults between specific types of software entities, specific types of users, specific types of data processing systems, and/or operating systems. These patterns may be identified through different statistical analysis normally used to identify patterns. Some examples of overall behavior of multiple updates on multiple data processing systems include a pattern in which an update fails every time an update is attempted on a machine running a particular operating system. In this case, updates on that specific operating system should not be performed in the future. Another example is if an update fails every time it is installed on a data processing system of a particular manufacturer. An example of another pattern is when a third update installs, but fails to pass testing whenever it is installed after the first update. Another pattern may be, for example, a fourth update never installs unless the second update has been installed first. Finer grained pattern detection also may be used to detect other patterns, such as, for example, patterns in performance or compatibility. These patterns may be used to adaptively modify the course of updates or other factors in the update process to decrease the incidence of faults and required roll backs in deployment. For example, a specific pattern may indicate a change in the manner in which an installation occurs or the selection of options for an update if particular steps or options are identified as causing more faults or failure in testing. In this manner, deployment or updates may be avoided on systems that are likely to fail testing. Further, these identifications may accelerate the deployment of software to update other computers. This is especially true in the instance in which the patterns identified show that an update is unlikely to cause any failures. Also, the deployment of updates may be ceased or terminated when the patterns indicate that many failures will occur. In other cases, the patterns may indicate that additional updates should be employed to improve the success of previous updates. This mechanism also may be used to identify modifications for updates in a manner to increase the likelihood that subsequent updates will be successful. An update procedure may be employed that automatically detects and responds to patterns, such as patterns in which certain installs fail or do not successfully occur based on what prior updates have or have not been performed. The update process may be adapted by changing the process to avoid failures in testing or installation of updates.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for updating a software component that is included in a data processing system, the method comprising the computer implemented steps of:
   determining whether to update the software component;
   responsive to a determination to update the software component, updating the software component to form an updated software component;
   tracking information, by a primary update management component, related to particular implementations;
   establishing a testing policy that specifies ones of a plurality of tests based on information related to a particular implementation;
   identifying a particular implementation used in the update of the software component;
   selecting ones of the plurality of tests that are specified for the particular implementation to form selected tests;
   automatically performing the selected tests on the updated software component;
   establishing an error procedure policy that specifies at least one of a plurality of error procedures based on a type of error;
   responsive to the updated software component failing one of the selected tests, determining a type of error that occurred;
   selecting one of the plurality of error procedures that is specified for the type of error that occurred;
   utilizing said selected one of the plurality of error procedures to determine whether a corrective action should be performed;
   in response to determining that no corrective action should be performed, leaving the updated software component unchanged; and,
   in response to determining that a corrective action should be performed, performing a corrective action according to the selected one of the plurality of error procedures.

2. The method of claim 1, wherein determining whether to update the software component comprises:
   determining whether an update is present for the software component;
   responsive to the update being present for the software component, determining whether the update should be applied to the software component; and
   responsive to a determination to apply the update to the software component, applying the update to the software component to form the updated software component.

3. The method of claim 1, wherein the corrective action includes rolling back the updated software component to a state prior to the update being made.

4. The method of claim 1, wherein the plurality of error procedures include identifying an alternative update, rolling back the updated software component to the software component without the update, installing a different software component, not performing any corrective action, and installing the alternative update.

5. The method of claim 1, wherein the update is a new parameter for a configuration file.

6. The method of claim 1, wherein the update is to an executable file for the software component.

7. The method of claim 1 further comprising:
storing data on at least one of updates, roll backs, test results from testing of the updated component, occurrences of faults between sets of users, occurrences of faults between specific types of software components, and occurrences of faults between sets of operating systems.

8. The method of claim 1, wherein the selected test includes at least one of performance testing, on-the-fly-regression testing, unit testing, and compatibility testing.

9. The method of claim 1, wherein a first party is a source of the software update, wherein a second party provides the policy, and wherein the policy is used in determining whether to update the software component.

10. The method of claim 1, wherein determining whether to update the software component comprises:
determining whether the update is available; and
if the update is available, determining whether to apply the update using a pattern of occurrences of faults correlating to at least one of specific types of software sources, users, types of operating systems, and types of data processing systems.

11. The method of claim 1 further comprising:
determining whether the software component was successfully updated to form the updated software component; and
responsive to a failure to successfully update the software component, sending a notification of the failure.

12. The method of claim 1 further comprising:
determining whether the software component was successfully updated to form the updated software component; and
responsive to a failure to successfully update the software component, reattempting updating of the software component.

13. The method of claim 1, further comprising:
the testing policy specifying an installation test and a performance test for the particular implementation;
automatically performing the installation test to determine whether the updated software component was installed properly;
in response to determining that the updated software component was installed properly, automatically performing the performance test on the updated software component to determine whether the updated software component meets a preset metric; and
in response to determining that the updated software component does not meet the preset metric, performing the corrective action.

14. A data processing system for updating a software component, the data processing system comprising:
a bus system;
a communications unit connected to the bus system;
a memory connected to the bus system, wherein the memory includes a set of instructions; and
a processing unit connected to the bus system, wherein the processing unit executes the set of instructions to determine whether to update the software component; update the software component to form an updated software component in response to a determination to update the software component; track information, by a primary update management component, related to particular implementations; establish a testing policy that specifies ones of a plurality of tests based on information related to a particular implementation; identify a particular implementation used in updating the software component; select ones of the plurality of tests that are specified for the particular implementation to form selected tests; automatically perform the selected tests on the updated software component; establish an error procedure policy that specifies at least one of a plurality of error procedures based on a type of error; responsive to the updated software component failing one of the selected tests, determine a type of error that occurred; select one of the plurality of error procedures that is specified for the type of error that occurred; utilize said selected one of the plurality of error procedures to determine whether a corrective action should be performed; in response to determining that no corrective action should be performed, leave the updated software component unchanged; and in response to determining that a corrective action should be performed, perform a corrective action according to the selected one of the plurality of error procedures.

15. A data processing system for updating a software component, the data processing system comprising:
first determining means for determining whether to update the software component;
updating means, responsive to a determination to update the software component, for updating the software component to form an updated software component;
first tracking means for tracking information, by a primary update management component, related to particular implementations;
first establishing means for establishing a testing policy that specifies ones of a plurality of tests based on information related to a particular implementation;
identifying means for identifying a particular implementation used in the update of the software component;
first selection means for selecting ones of the plurality of tests that are specified for the particular implementation to form selected tests;
testing means for automatically performing the selected tests on the updated software component;
second establishing means for establishing an error procedure policy that specifies at least one of a plurality of error procedures based on a type of error;
second determining means, responsive to the updated software component failing one of the selected tests, for determining a type of error that occurred;
second selection means for selecting one of the plurality of error procedures that is specified for the type of error that occurred;
utilizing means for utilizing said selected one of the plurality of error procedures to determine whether a corrective action should be performed;
means responsive to determining that no corrective action should be performed, for leaving the updated software component unchanged and
performing means, responsive to determining that a corrective action should be performed, for performing a corrective action according to the selected one of the plurality of error procedures.

16. The data processing system of claim 15, wherein the first determining means further comprises:
third determining means for determining whether an update is present for the software component;

fourth determining means, responsive to the update being present for the software component, for determining whether the update should be applied to the software component; and applying means, responsive to a determination to apply the update to the software component, for applying the update to the software component to form the updated software component.

17. The data processing system of claim 15, wherein the corrective action includes rolling back the updated software component to a state prior to the update being made.

18. The data processing system of claim 15, wherein the corrective action includes at least one of identifying an alternative update, rolling back the updated software component to the software component without the update, installing a different software component, and installing the alternative update.

19. The data processing system of claim 15, wherein the update is a new parameter for a configuration file.

20. The data processing system of claim 15, wherein the update is to an executable file for the software component.

21. The data processing system of claim 15 further comprising:

storing means for storing data on at least one of updates, roll backs, test results from testing of the updated component, occurrences of faults between sets of users, occurrences of faults between specific types of software components, and occurrences of faults between sets of operating systems.

22. The data processing system of claim 15, wherein the selected test includes at least one of performance testing, on-the-fly-regression testing, unit testing, and compatibility testing.

23. The data processing system of claim 15, wherein a first party is a source of the software update, wherein a second party provides the policy, and wherein the policy is used in determining whether to update the software component.

24. The data processing system of claim 15, wherein the first determining means comprises:

first means for determining whether the update is available; and second means, responsive to the update being available, for determining whether to apply the update using a pattern of occurrences of faults correlating to at least one of specific types of software sources, users, types of operating systems, and types of data processing systems.

25. The data processing system of claim 15, wherein the first determining means further comprising:

third determining means for determining whether the software component was successfully updated to form the updated software component; and sending means, responsive to a failure to successfully update the software component, for sending a notification of the failure.

26. The data processing system of claim 15, wherein the updating means is a first updating means, and further comprising:

third determining means for determining whether the software component was successfully updated to form the updated software component; and second updating means, responsive to a failure to successfully update the software component, for reattempting updating of the software component.

27. The data processing system of claim 26, wherein the notification is sent after at least two attempted updates to the software component have failed.

28. A computer program product in a statutory tangible computer readable medium for updating a software component, the computer program product comprising:

first instructions for determining whether to update the software component;

second instructions, responsive to a determination to update the software component, for updating the software component to form an updated software component;

third instructions for tracking information, by a primary update management component, related to particular implementations; and fourth instructions for establishing a testing policy that specifies one of a plurality of tests based on information related to a particular implementation;

fifth instructions for identifying a particular implementation used to implement the data processing system;

sixth instructions for selecting ones of the plurality of tests that are specified for the particular implementation to form selected tests;

seventh instructions for automatically performing the selected tests on the updated software component; and eighth instructions, responsive to the updated component failing one of the selected tests, for performing a corrective action, by selecting one of a plurality of error procedures based on a type of error, from an error procedure policy.

* * * * *